United States Patent [19]

Kobayashi

[11] Patent Number: 4,576,784

[45] Date of Patent: Mar. 18, 1986

[54] WATER SPARGER FOR A BOILING WATER REACTOR

[75] Inventor: Masahiro Kobayashi, Ebina, Japan

[73] Assignee: Tokyo Shibaura Denki Kabushiki Kaisha, Kawasaki, Japan

[21] Appl. No.: 412,030

[22] Filed: Aug. 26, 1982

[30] Foreign Application Priority Data

Aug. 31, 1981 [JP] Japan .................. 56-136369

[51] Int. Cl.$^4$ .................. G21C 15/00
[52] U.S. Cl. .................. 376/352; 376/377; 137/592
[58] Field of Search .............. 376/352, 377, 372, 399, 376/286, 283; 137/599, 590, 592

[56] References Cited

U.S. PATENT DOCUMENTS

| 1,081,132 | 12/1913 | Morison | 137/592 |
| 3,366,548 | 1/1968 | O'Neil | 376/372 |
| 3,380,649 | 4/1968 | Roberts | 376/372 |
| 4,228,013 | 10/1980 | Degenkolb et al. | 137/592 |
| 4,298,433 | 11/1981 | Kinnander et al. | 376/286 |
| 4,399,082 | 8/1983 | Becker et al. | 376/283 |

FOREIGN PATENT DOCUMENTS

| 2901418 | 9/1979 | Fed. Rep. of Germany . | |
| 2829590 | 1/1980 | Fed. Rep. of Germany | 376/352 |
| 2950675 | 7/1980 | Fed. Rep. of Germany . | |
| 0026995 | 7/1978 | Japan | 376/352 |
| 0076297 | 7/1978 | Japan | 376/357 |
| 0019085 | 2/1979 | Japan | 376/283 |
| 0162087 | 12/1979 | Japan | 376/283 |

Primary Examiner—Harvey E. Behrend
Attorney, Agent, or Firm—Oblon, Fisher, Spivak, McClelland & Maier

[57] ABSTRACT

In a boiling water reactor having a reactor pressure vessel, a reactor core disposed in the reactor pressure vessel, a plurality of reactor water circulators arranged on the circumference at equal intervals along the reactor pressure vessel and below the reactor core in the reactor pressure vessel and water spargers circumferentially arranged in the reactor pressure vessel, each of the water spargers comprises a plurality of vertical water supplying headers which surround the reactor core above and between adjacent ones of the reactor water supplying circulators and which have vertically arranged water spraying apertures directed to the reactor core.

6 Claims, 13 Drawing Figures

WATER SPARGER FOR A BOILING WATER REACTOR

BACKGROUND OF THE INVENTION

The present invention relates to a water sparger for a boiling water reactor.

A conventional water sparger for a boiling water reactor is shown in FIGS. 1 and 2. A shroud 2 is disposed in a reactor pressure vessel 1, and a reactor core 3 is housed in the shroud 2. A mixture of steam and water which is generated in the reactor core 3 flows upward and is separated into steam and water in a steam separator 4. The steam is then separated from its moisture in a steam dryer 5 and is supplied from a main steam nozzle 6 to a turbine (not shown) through a main steam piping (not shown). The steam, after it has been used to drive the turbine, is condensed in a condenser (not shown) and returns to the reactor pressure vessel 1 through water spargers 7. The water separated from said mixture in the steam separator 4 is mixed with water sprayed from the water spargers 7. The mixed water flows downward through annular downcomers 8 formed between the inner face of the reactor pressure vessel 1 and the outer face of the shroud 2. The mixed water is then supplied to the lower portion of the reactor pressure vessel 1 by a plurality of reactor water circulators 9 which are circumferentially arranged below the downcomers 8. The mixed water flows from the bottom of reactor pressure vessel 1 into the core 3. The water flowing into the reactor core 3 is heated therein to become a mixture of steam and water. The mixture is then supplied to the steam separator 4 and is separated into water and steam. This water is mixed with water sprayed from the water spargers 7 and is supplied again to the lower portion of the reactor pressure vessel 1. The above-mentioned circulation is repeated. Each water sparger 7 has water supplying headers 10 each comprising an arcuate pipe, as shown in FIG. 2. The water supplying headers 10 are horizontally and circularly arranged so that water is sprayed from a number of nozzle orifices 11 formed on each water supplying header 10, whereby relatively hot water separated from the steam separator 4 is uniformly mixed with the relatively cool water sprayed from the water supplying headers 10.

The flow of the water separated in the steam separator 4 and the flow of the water sprayed from the water supplying headers 10 are schematically shown in FIG. 3. The hot water separated in the steam separator 4 spreads horizontally and radially and the flow downward in the downcomer 8 is substantially vertical. The hot water then flows into the reactor water circulators 9. The hot water with a flow rate $Qa$ which flows in a region $Wa$ flows into a reactor water circulator $9a$; the hot water with a flow rate $Qb$ which flows in a region $Wb$ flows into a reactor water circulator $9b$; and the hot water with a flow rate $Qc$ which flows in a region $Wc$ flows into a reactor water circulator $9c$. Similarly, the water sprayed from the water supplying headers 10 with a flow rate $qa$ in the region $Wa$ is supplied to the reactor water circulator $9a$; the water sprayed therefrom with a flow rate $qb$ in the region $Wb$ is supplied to the reactor water circulator $9b$; and the water sprayed therefrom with a flow rate $qc$ in the region $Wc$ is supplied to the reactor water circulator $9c$. The flow rates $Qa$, $Qb$ and $Qc$ are equal to each other. However, the flow rate distribution of the water sprayed from the water supplying headers 10 in the vicinity of the inner face of the reactor pressure vessel 1 can hardly be kept uniform due to a pressure drop in the water supplying headers 10 and other factors. As a result, the flow rates $qa$, $qb$ and $qc$ vary from each other. The total flow rates $Qa$ and $qa$, $Qb$ and $qb$, and $Qc$ and $qc$ differ from each other so that water discharged from the reactor water circulators 9 varies in temperature. For this reason, the temperature distribution of the water flowing into the reactor core 3 becomes nonuniform, leading to a nonuniform void fraction in the reactor core 3 preventing uniform reaction of the fuel and its complete combustion.

Hot water in the conventional steam separator 4 directly flows on the water supplying headers 10, thereby causing significant thermal stress to occur in the water supplying headers 10. Further, since the water supplying headers 10 are horizontally disposed, they interfere with an underwater TV camera and tools when such equipment is lowered in the downcomer for inspection of the reactor water circulators.

SUMMARY OF THE INVENTION

It is, therefore, an object of the present invention to provide a water sparger for a boiling water reactor, wherein water flowing into a reactor core is maintained at a uniform temperature, a very low thermal stress is applied to sparger inlet nozzle and water headers do not prevent the inspection of reactor water circulators.

In order to achieve the above object of the present invention, there is provided a water sparger for a boiling water reactor which has a reactor pressure vessel, a reactor core disposed in the reactor pressure vessel, and a plurality of reactor water circulators horizontally arranged at equal intervals around a circumference of the reactor pressure vessel and below the reactor core in said reactor pressure vessel, wherein the water sparger comprises a plurality of vertically extending water supplying headers which surround the reactor core in the reactor pressure vessel above and between adjacent ones of the reactor water circulators and which have vertically arranged water spraying nozzle orifices directed to the reactor core.

When the water sparger of this type is used, cold water from the water supplying headers mixed with hot water flows in the reactor water circulators at a predetermined ratio and is mixed so that water at a uniform temperature is discharged from the reactor water circulators into the bottom of the reactor pressure vessel. Since the water sprayed from the water supplying headers flows below the sparger inlet nozzle, the thermal stress thereof is decreased. The vertical construction of the water supplying headers allows for easy inspection of the reactor water circulators.

BRIEF DESCRIPTION OF THE DRAWINGS

This invention can be fully understood from the following detailed description with reference to the accompanying drawings in which.

DETAILED DESCRIPTION OF THE PREFERRED EMBODIMENTS

Figure 1:
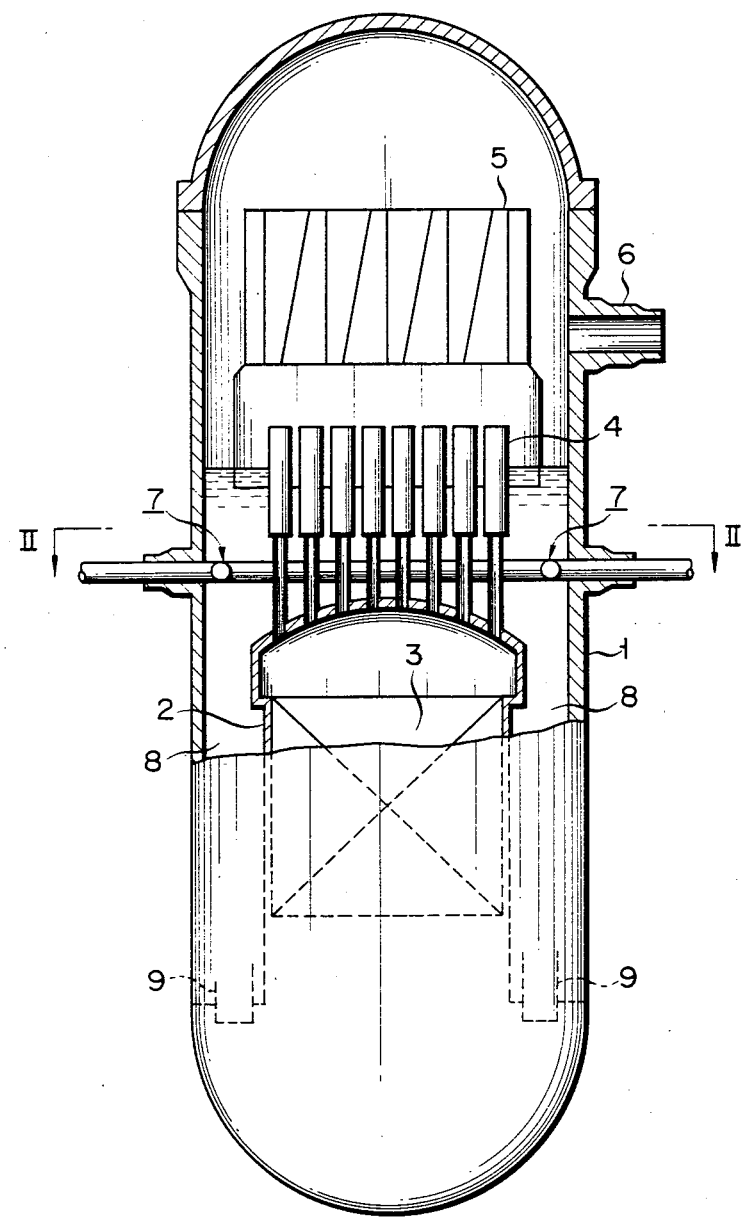
FIG. 1 is a vertical sectional view of a conventional reactor pressure vessel for a boiling water reactor.
Figure 2:
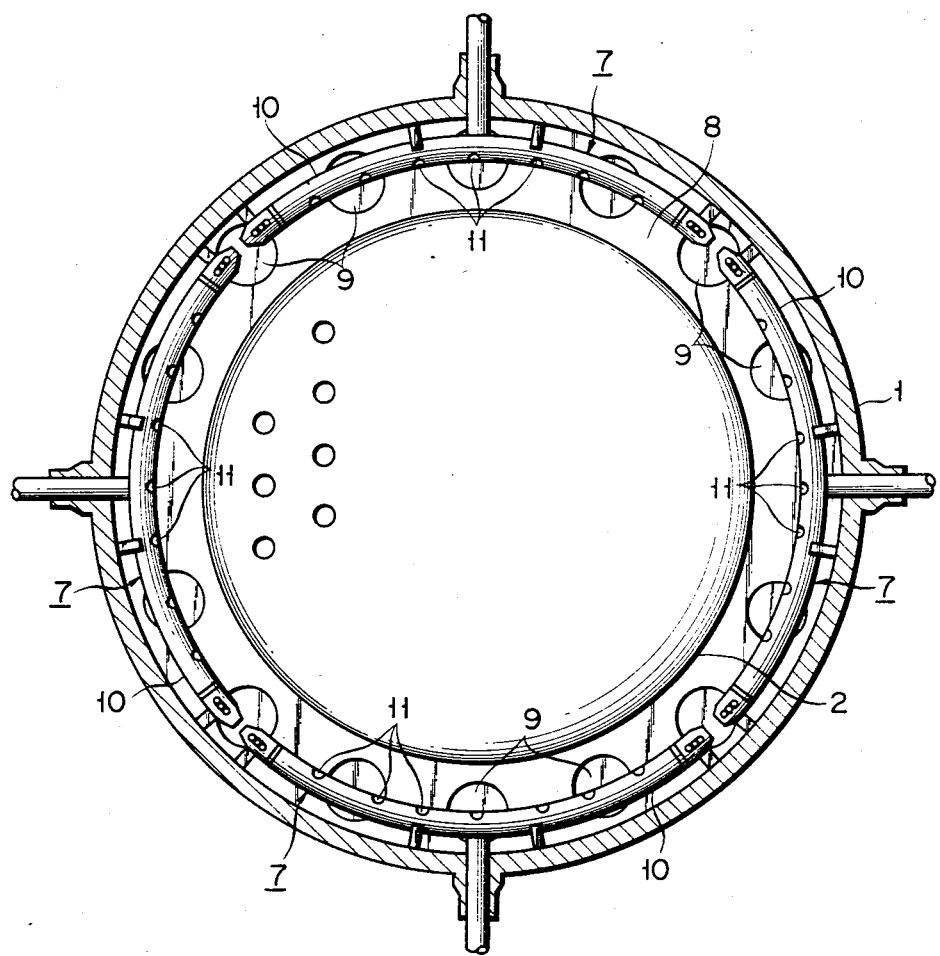
FIG. 2 is a horizontal sectional view of the reactor pressure vessel taken along the line II—II of FIG. 1.
Figure 3:
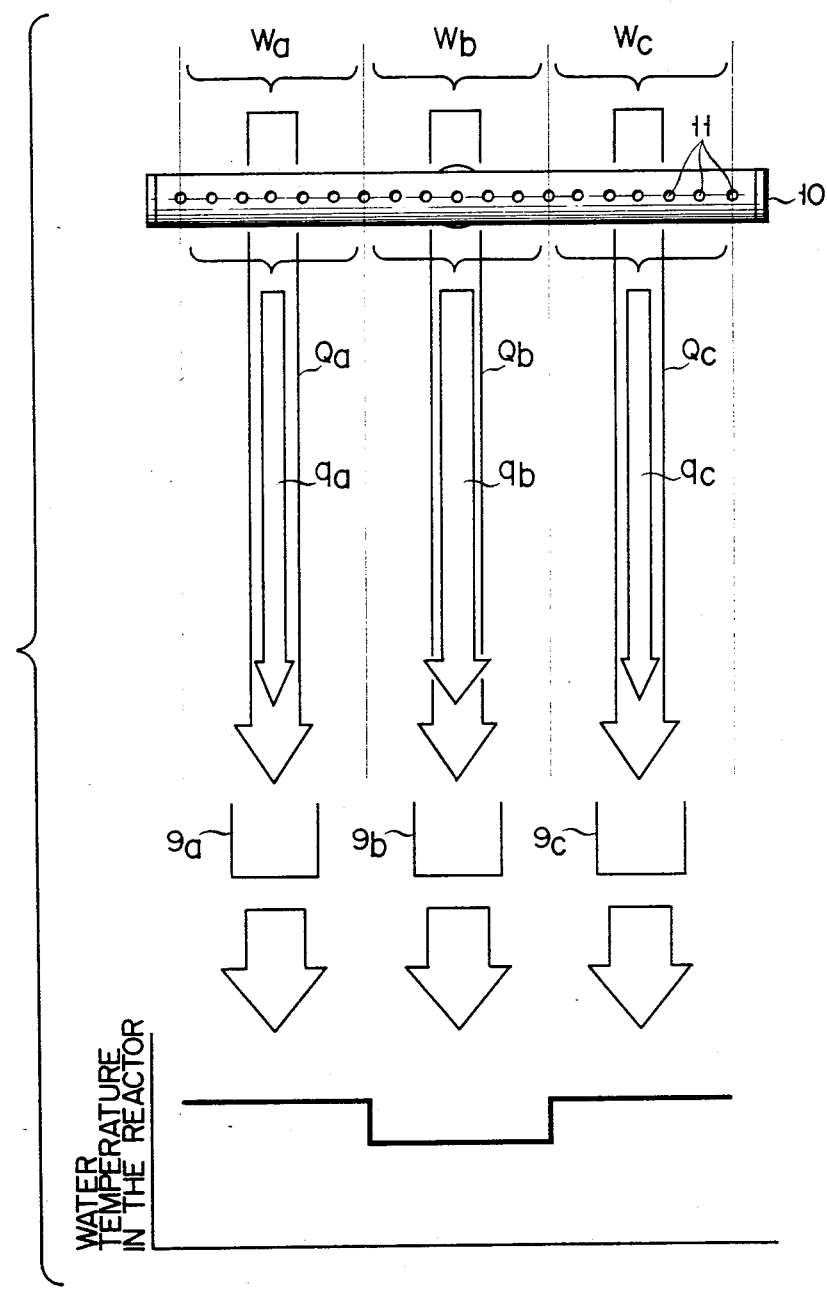
FIG. 3 is a schematic illustration of the flows of hot water from a steam separator and cold water from water supplying headers in the reactor pressure vessel shown in FIG. 1.
Figure 4:
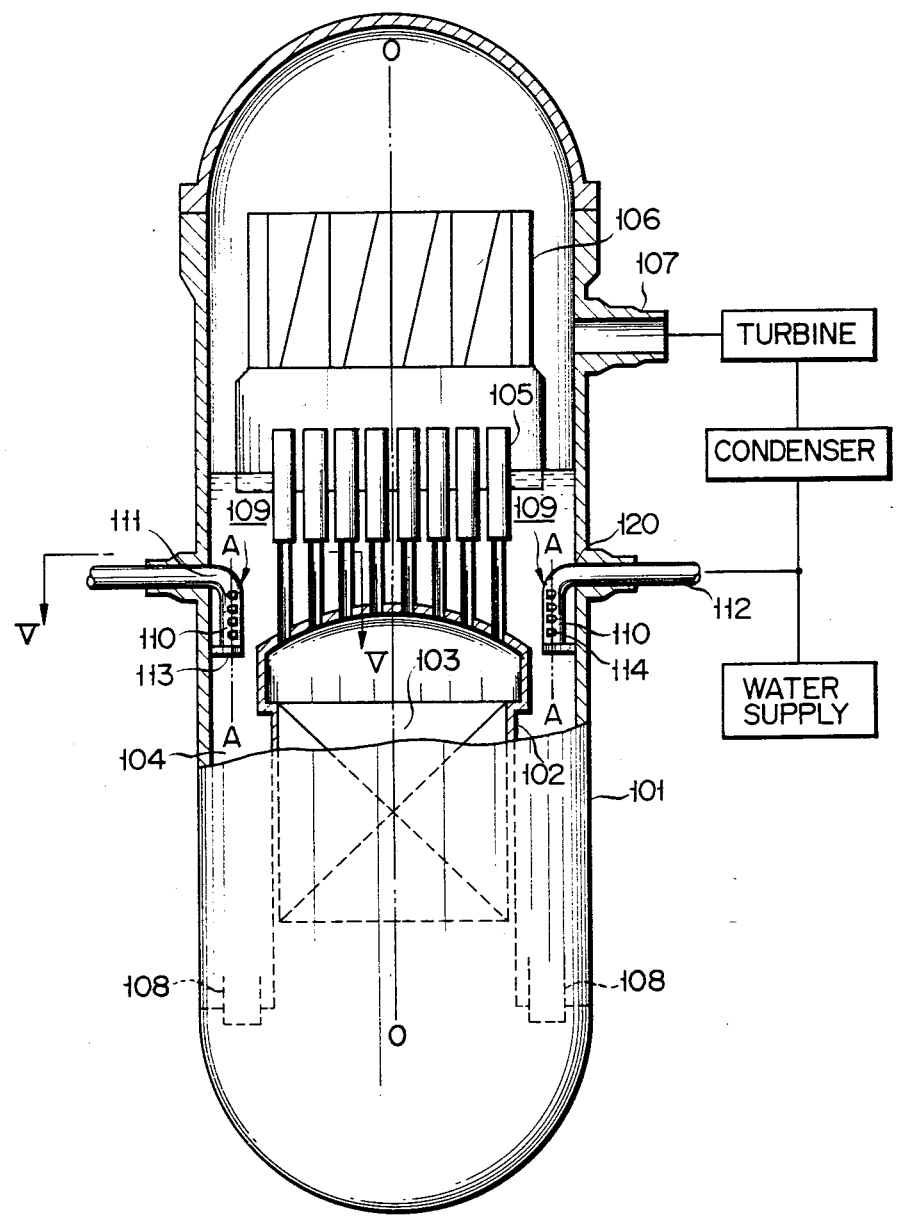
FIG. 4 is a longitudinal sectional view of a reactor pressure vessel for a boiling water reactor to which a water sparger according to a first embodiment of the present invention is applied.

Water spargers according to first and second embodiments of the present invention will be described with reference to FIGS. 4 to 11. FIGS. 4 to 8 show a water sparger with water supplying headers according to the first embodiment of the present invention. In a reactor pressure vessel 101, a shroud 102 is disposed. A reactor core 103 is housed in the shroud 102. An annular downcomer 104 is defined between the outer face of the shroud 102 and the inner face of the reactor pressure vessel 101. Water flows downward along the annular downcomer 104 and is supplied to the reactor core 103. The water is heated and steam is produced here. The water containing steam is sent to a steam separator 105 disposed above the reactor core 103, whereby the steam is separated from the water. The steam is then supplied to a steam dryer 106 and is separated into dry vapor and moisture there. The vapor is supplied from a main steam nozzle 107 to a turbine through a main steam piping. The vapor, after driving the turbine, is then condensed into water in a condenser, and returns to the reactor pressure vessel 101. A plurality of reactor water circulators 108 are disposed below the downcomer 104, and draw the water separated in the steam separator 105 and water supplied from water spargers 109 (to be described later) through the downcomer 104. Water is supplied by the reactor water circulators 108 to the lower portion of the reactor pressure vessel 101 and then to the reactor core 103.

Figure 5:
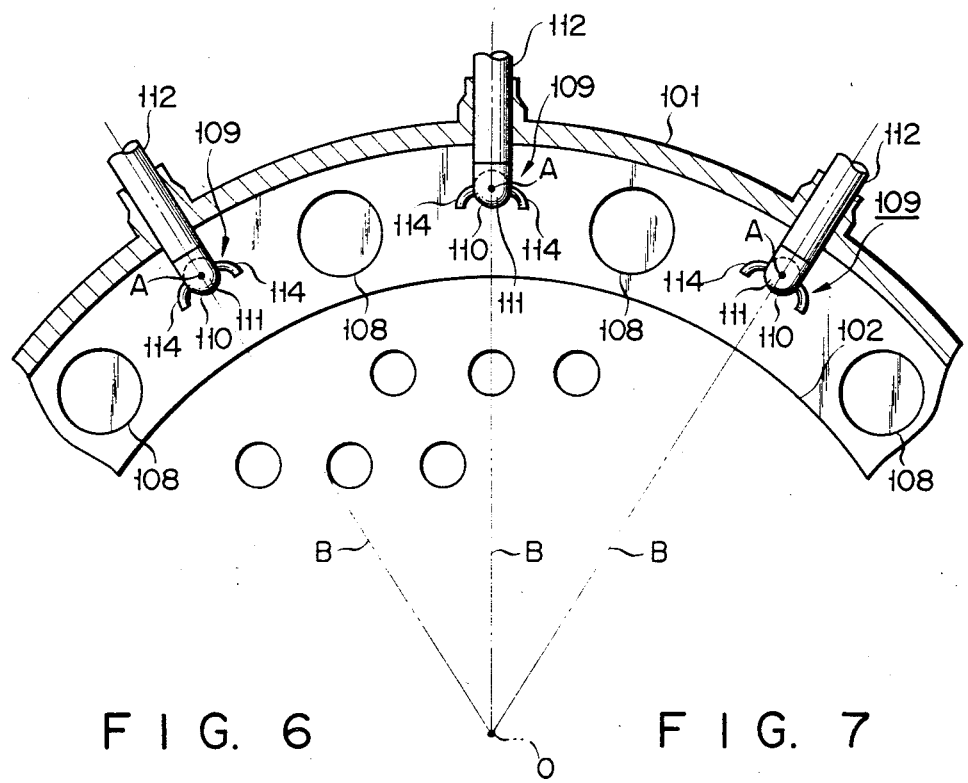
FIG. 5 is a sectional view of the reactor pressure vessel taken along the line V—V in FIG. 4.
Figure 6:
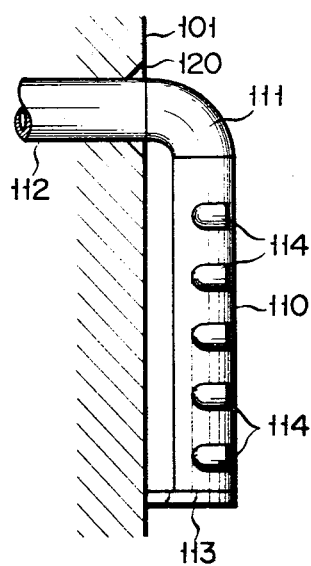
FIG. 6 is a side view of a water supplying header of the water sparger used in the reactor pressure vessel in FIG. 4 according to the first embodiment of the present invention.
Figure 7:
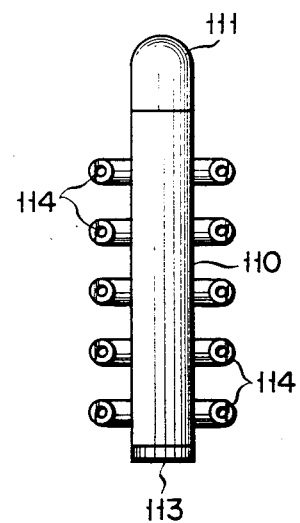
FIG. 7 is a front view of the water supplying header shown in FIG. 6.

The arrangement of the water spargers 109 which supply water to the reactor pressure vessel 101 will be described. Each water sparger 109 has a water supplying header 110, which is disposed above the reactor water circulators 108 at the upper portion of the shroud 102. As shown in FIG. 5, each water supply header 110 is disposed above and at the middle portion of adjacent reactor water circulators 108 and comprises a vertically extending straight pipe. Each water supplying header 110 is at its upper end connected to a horizontal water supplying pipe 112 connected by an elbow 111, and is supported at its lower end on the inner face of the reactor pressure vessel 101 by a metal support element 113. A plurality of vertically arranged water spraying nozzles 114 are formed in each water supplying header 110. Water supplied through the water supplying pipe 112 and the water supplying header 110 is sprayed from the water spraying nozzles 114 into the reactor pressure vessel 101. Two rows of water spraying nozzles 114 each of which has an elbow shape are provided on both lateral sides of the water supplying header 110 so that the free ends of the water spraying nozzles 114 are directed toward the center of the reactor pressure vessel 101. The two rows of water spraying nozzles 114 on both lateral sides of each water supplying header 110 are symmetrical with respect to a plane B including an axis O—O of the reactor pressure vessel 101 and an axis A—A of each water supplying header 110. The free end of the water spraying nozzles 114 on each row are disposed on a vertical line at equal intervals.

In the sparger with the above arrangement according to the first embodiment of the present invention, water is supplied to the water supplying headers 110 through the respective water supplying pipes 112 and is sprayed from the water supplying nozzles 114 into the vessel 101. The sprayed cool water is mixed with the hot water separated in the steam separator 105 and is drawn into the reactor water circulators 108 via the downcomer 104. The water is then supplied to the lower portion of the reactor pressure vessel 101 and flows into the reactor core 103 therefrom at a moderate temperature.

Figure 8:
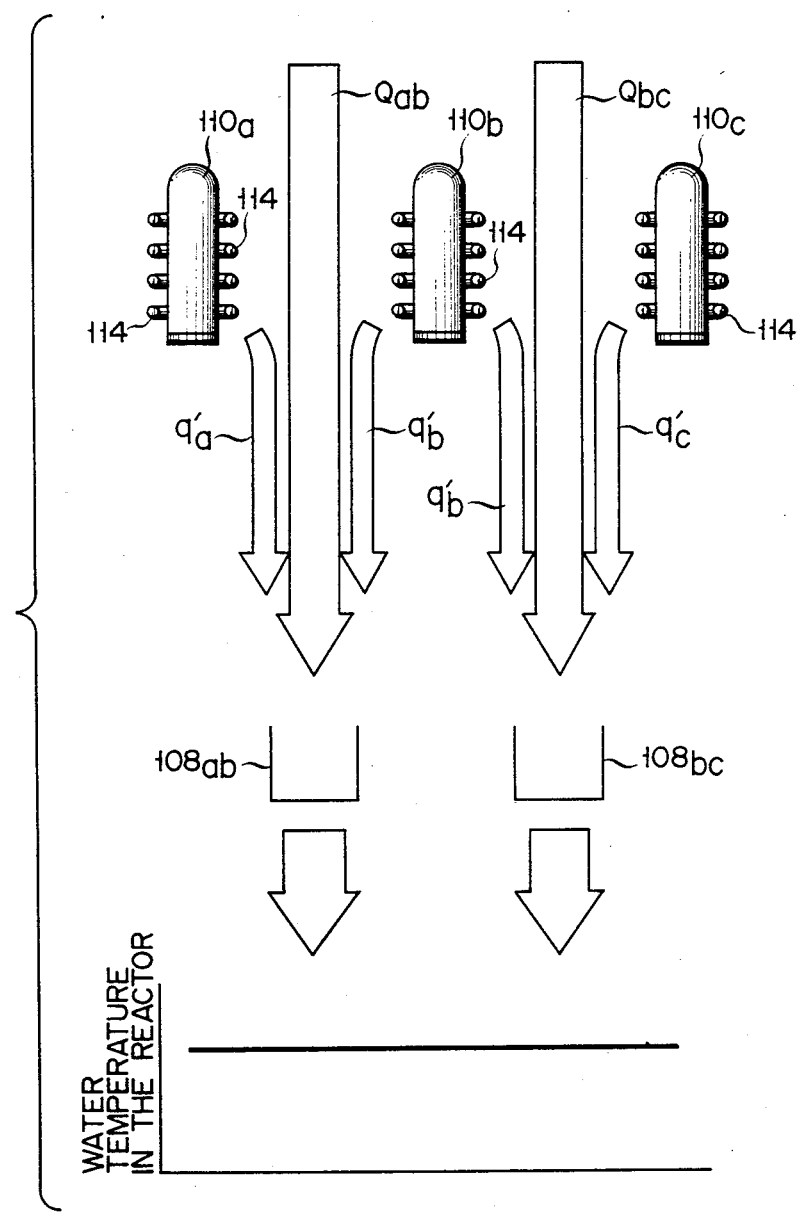
FIG. 8 is a schematic illustration of hot water from the steam separator and cool water from the water supplying headers of the reactor pressure vessel in FIG. 5.

Flows of water separated in the steam separator and water sprayed from the nozzles are illustrated in FIG. 8. Water in the vessel 101 is drawn into the reactor water circulators 108$ab$ and 108$bc$ (suffixes ab and bc are added to reference numeral 108 so as to specify which reactor water circulators are selected) at flow rates of Qab and Qbc which are equal to each other. Water supplied to water supplying headers 110$a$, 110$b$ and 110$c$ (suffixes numerals a, b and c are added to reference number 110 so as to specify which water supplying headers are selected) is sprayed from the respective water spraying nozzles 114. Since the water spraying nozzles 114 are disposed on both sides of each of the water supplying headers 110$a$, 110$b$ and 110$c$, water sprayed from the water supplying header 110$a$, 110$b$, and 110$c$ flows in a symmetrical manner on both lateral sides of the water supplying header 110$a$, 110$b$ and 110$c$. Water at flow rates $q'a$ and $q'b$ which are equal to half of the flow rates of the water sprayed from the water supplying headers 110$a$ and 110$b$ respectively is drawn into the reactor water circulator 108$ab$. Similarly, cool water at flow rates $q'b$ and $q'c$ which are equal to half of the flow rates of the water sprayed from the water supplying headers 110$b$ and 110$c$ respectively is drawn into the reactor water circulator 108$bc$. If the flow rates of water sprayed from the water supplying headers 110$a$, 110$b$ and 110$c$ are equal to each other, the flow rates $q'a$, $q'b$ and $q'c$ become also equal to each other with the result that the mixture of hot and cold water is drawn at an equal flow rate into the reactor water circulators 108$ab$ and 108$bc$. Hot water separated in the steam separator and cool water sprayed from the water supplying headers are drawn into the reactor water circulators 108$ab$ and 108$bc$ to be uniformly mixed with each other. The mixed water discharged from each of the reactor water circulators 108ab and 108bc has the same temperature. Therefore, the water flowing into the reactor core 103 also has a uniform temperature. Further, since cool water is sprayed from a number of water spraying nozzles 114, the mixture of water separated in the steam separator 105 and the water sprayed from the nozzles 114 before hot and cool water is drawn into the reactor water circulators 108ab and 108bc is substantially uniform preventing insufficient mixing. Further, a pair of water flows from each water supplying header need only be symmetrical with each other. But, the vertical distribution of the flow rates of the water along the water supplying headers 110a, 110b and 110c is not always uniform in order to sufficiently mix the water separated in the steam separator with the water sprayed from the water supplying headers. With this invention, therefore, there is no drawback such as the temperature distribution of water flowing into the reactor core becoming nonuniform due to the nonuniform flow rate distribution of water sprayed from the water supplying heads along them as in the conventional reactor.

The water supplying headers 110 according to the present invention are vertically disposed so as to extend in the direction in which hot water flows, and sprayed flow is mixed at the region below the sparger inlet nozzle 120. The cool water sprayed from the water supplying headers 110 flows along the water supplying headers 110 whereby the fluctuation of thermal stress of the sparger inlet nozzle 120 is decreased.

Further, since the water supplying headers 110 are vertically disposed, and each water supplying header 110 is positioned above and between adjacent reactor water circulators 108, the water headers 110 may not interfere with the inspection equipment when it is suspended in the reactor pressure vessel 101 for the inspection of the circulators 108.

Figure 9:
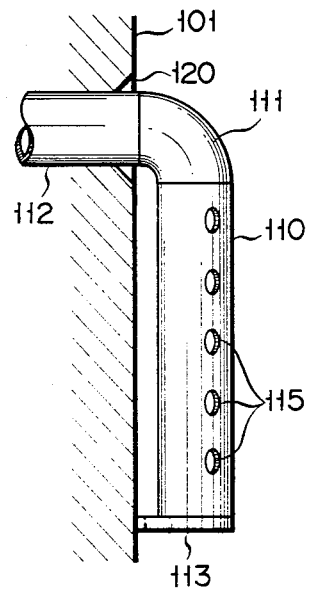
FIG. 9 is a side view of another water supplying header of the water sparger according to a second embodiment of the present invention.
Figure 10:
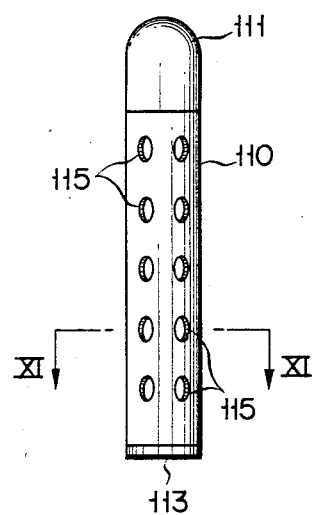
FIG. 10 is a front view of the water supplying header shown in FIG. 9.
Figure 11:
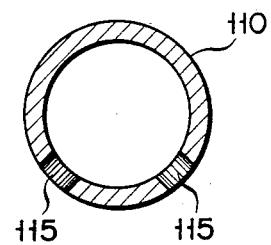
FIG. 11 is a sectional view of the water supplying header taken along the line XI—XI in FIG. 10.

FIGS. 9 to 11 show a water sparger according to a second embodiment of the present invention. The water sparger is substantially the same as that of the first embodiment except that two rows of water spraying ports 115 are arranged in place of the water spraying nozzles 114. The water sparger of the second embodiment provides the same effects as that of the first embodiment.

The water spraying ports may not be limited to the arrangements of the first and second embodiments. Nozzles and nozzle orifices of other structures may also be used.

In an actual reactor, various pieces of equipment are disposed in the reactor pressure vessel. Due to the arrangement of the equipment, the flow direction of the water in the downcomer may be circumferentially deviated. Further, the reactor water circulators and water supplying headers may not be disposed at equal intervals due to the required positional relationship between them and other pieces of equipment. In this case, the water supplying headers are designed to allow for asymmetrical flow of water sprayed therefrom in order for the water to have a uniform temperature.

Figure 12:
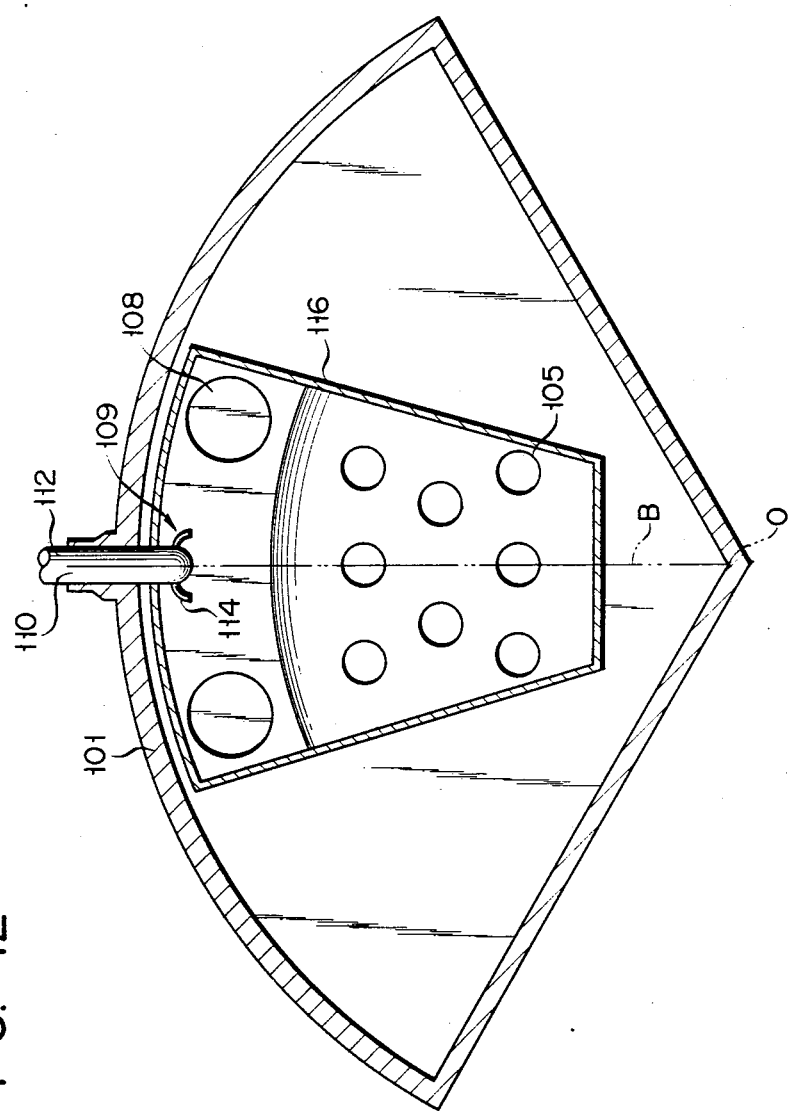
FIG. 12 is a horizontal sectional view of an experimental model modified from the reactor pressure vessel of FIG. 4.

FIG. 12 is a schematic view of a device for testing flow rate characteristics of the present invention. A sector-shaped vessel having a central angle of 120° is used as an experimental model or as a simulation pressure vessel 101. A water supplying pipe 112 is disposed at the center of an arc-shaped wall of the simulation pressure vessel 101. An enclosure 116 having a substantially trapezoidal cross section is disposed in the simulation pressure vessel 101. The water supplying pipe 112 extends through the enclosure 16. Two reactor water circulators 108 are disposed at the lower end of the enclosure 116. Steam separators 105 are disposed upright in the enclosure 116. More steam separators 105 are formed in the actual model. For illustrative convenience, the number of steam separators 105 is limited in the figure.

In the above experimental model, the inner diameter (distance between the center O and the inner face of the arc-shaped wall of the simulation pressure vessel 101) was 3,205 mm; the thickness of the vessel 101 was 300 mm; the height of the vessel wall was 2,500 mm; and the height of the steam separator 105, measured from the bottom of the simulation pressure vessel 101, was 3,181 mm.

The dimensions of the sparger were as follows:

Outer diameter of the water supplying header 110: 165.2 mm;

Diameter of the orifice of the elbow-shaped nozzle 114: 45 mm;

Distance between the centers of the orifices at both sides of the elbow-shaped nozzle 114: 356.8 mm;

Distance between the centers of the vertically adjacent orifices of the elbow-shaped nozzle 14: 180 mm;

The number of nozzles of each row: 16.

Figure 13:
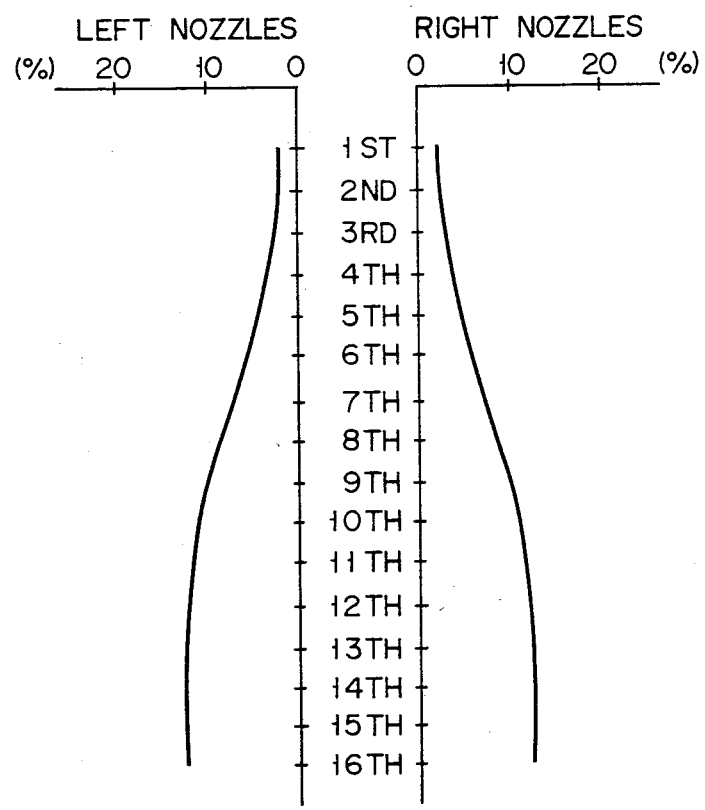
FIG. 13 is an experimental result of water flow rate distribution obtained from the experimental model of FIG. 12.

The fluid supplied from the sparger was tap water. The total amount of water flowing from the nozzles of the two rows was 16.49 $m^3$/min FIG. 13 shows the water flow rate distribution of each nozzle. The flow rate is the percentage of the amount of sprayed water from each nozzle for the half of the total amount of sprayed water. As may be apparent from the result shown in FIG. 13, the amount of water sprayed from each nozzle of the water supplying header in the simulation pressure vessel is symmetrical with respect to a plane B, so that a substantially uniform water flow is obtained at the same water level in the simulation pressure vessel. Further, temperature variation does not occur at the same level. Since the water flow rate distribution of the steam separator is substantially the same as that of the water supplying header, the water temperature in the simulation pressure vessel is substantially kept constant as a whole.

In summary, the water supplying headers are arranged vertically and disposed in intervals close to the inner face of the reactor pressure vessel circumference, each water supplying header is arranged above and between adjacent reactor water circulators, and the water spraying ports are vertically arranged in the water supplying header. Therefore, water sprayed from one row of the nozzles of each water supplying header (that is half of the water sprayed from the header) is drawn into a reactor water circulator at the same temperature without being affected by nonuniform vertical distribution of the flow rate of cool water. Accordingly, the temperature of water drawn into the reactor core becomes uniform as does the temperature of water discharged from the reactor water circulator. Further, since the cool water is sprayed from a number of water spraying nozzles, the mixing of hot water and cool water is substantially uniform. This water becomes even further mixed to near perfect uniformity when it passes the reactor water circulators. Further, since the water supplying headers are vertically disposed, the area thereof which is in direct contact with the hot water is small and the cool water sprayed from the water supplying headers flows therealong, whereby the thermal stress of the water supplying headers is decreased. Moreover, since each water supplying header is arranged above and between adjacent reactor water circulators, inspection equipment can be installed in the reactor pressure vessel for inspecting the reactor water circulators without being obstructed by the water supplying headers.

I claim:

1. In a boiling water reactor having a reactor pressure vessel, a shroud disposed in said reactor pressure vessel, a reactor core housed in said shroud, a plurality of reactor water circulators arranged substantially equidistantly on the circumference along the inner surface of said reactor pressure vessel at a level below said reactor core for directing water along a flow path in said reactor pressure vessel from said reactor water circulators through said reactor core to a portion of said reactor pressure vessel above said reactor core and then downwards between said shroud and the inner surface of said reactor pressure vessel to said reactor water circulators, a water sparger for injecting water into a portion of said flow path between said shroud and the inner surface of said reactor pressure vessel, said water sparger comprising:

a plurality of vertically elongated water supplying headers, said plurality of headers being equal in number to said plurality of reactor water circulators, said water supplying headers surrounding said reactor core above said reactor water circulators, each of said water supplying headers being arranged along a vertical plane substantially equidistant from two adjacent said reactor water circulators, a circumferential extent of said headers being limited such that said headers do not extend to vertical radial planes intersecting said adjacent circulators, each of said water supplying headers having thereon one or more vertical rows of apertures directed radially inwardly to said reactor core, said vertical rows being fewer in number than the number of said apertures in each vertical row.

2. A water aparger according to claim 1, wherein said vertical rows of said water spraying apertures are arranged symmetrically about said vertical planes.

3. A water sparger according to claim 2, wherein said water spraying apertures are arranged in two rows of each of said water supplying headers.

4. A water sparger according to claim 3, wherein said water spraying apertures of said each of said two rows are arranged at equal intervals.

5. A water sparger according to any one of claims 2 or 3 or 4 or 1, wherein said water spraying apertures comprise elbow-shaped nozzles extending from the respective water supplying headers.

6. A water sparger according to any one of claims 2 or 3 or 4 or 1, wherein said water spraying apertures comprise ports formed in said water supplying headers.

* * * * *